US006944372B2

(12) United States Patent
Boettcher et al.

(10) Patent No.: US 6,944,372 B2
(45) Date of Patent: Sep. 13, 2005

(54) TUNABLE DISPERSION COMPENSATING BANDWIDTH DEVICE FOR FIBER OPTICS SYSTEM

(75) Inventors: Evelyn Boettcher, Greenbelt, MD (US); Sandeep T. Vohra, Ellicott City, MD (US); Gregg Johnson, Fairfax, VA (US)

(73) Assignee: Broadband Royalty Corporation, Wilmington, DE (US)

( * ) Notice: Subject to any disclaimer, the term of this patent is extended or adjusted under 35 U.S.C. 154(b) by 240 days.

(21) Appl. No.: 09/957,022

(22) Filed: Sep. 21, 2001

(65) Prior Publication Data

US 2003/0059163 A1 Mar. 27, 2003

(51) Int. Cl.⁷ .................................................. G02B 6/34
(52) U.S. Cl. ......................................................... 385/37
(58) Field of Search .......................... 385/37, 31, 137, 385/12, 15, 19; 359/115, 124, 130, 341

(56) References Cited

U.S. PATENT DOCUMENTS

| | | | |
|---|---|---|---|
| 4,599,908 A | * | 7/1986 | Sheridan et al. ......... 73/862.046 |
| 5,557,468 A | | 9/1996 | Ip |
| 5,608,562 A | | 3/1997 | Delavaux et al. |
| 5,655,040 A | | 8/1997 | Chesnoy et al. |
| 5,680,491 A | | 10/1997 | Shigematsu et al. |
| 5,751,243 A | | 5/1998 | Turpin |
| 5,784,191 A | | 7/1998 | Wood |
| 5,793,907 A | | 8/1998 | Jalali et al. |
| 5,805,751 A | | 9/1998 | Kewitsch et al. |
| 5,974,206 A | | 10/1999 | Bricheno et al. |
| 5,982,963 A | | 11/1999 | Feng et al. |
| 6,055,081 A | | 4/2000 | Koyano et al. |
| 6,055,348 A | | 4/2000 | Jin et al. |
| 6,088,088 A | | 7/2000 | Fortenberry |
| 6,104,515 A | | 8/2000 | Cao |
| 6,122,418 A | | 9/2000 | Ellis |
| 6,137,924 A | | 10/2000 | Strasser et al. |
| 6,148,127 A | | 11/2000 | Adams et al. |
| 6,154,588 A | | 11/2000 | Kai |
| 6,157,477 A | | 12/2000 | Robinson |
| 6,327,091 B1 | * | 12/2001 | Agano ........................ 359/619 |

OTHER PUBLICATIONS

Vohra et al., "Dynamic Dispersion Compensation Using Bandwidth Tunable Fiber Bragg Gratings," U.S. Naval Research Laboratory, Optical science Division, Reprint of paper presented at: European Conference on Optical Comm., Munich, Germany (Sep. 2000).

Eggleton et al., "Electrically Tunable Power Efficient Dispersion Compensating Fiber Bragg Grating," IEEE Photonics Technology Letters, vol. 11, No. 7, Jul. 1999, pp. 854–856.

Iocco et al., "Bragg Grating Fast Tunable Filter for Wavelength Division Multiplexing,", Journal of Lightwave Technology, vol. 17, No. 7, Jul. 1999, pp. 1217–1221.

Ouellette, "Dispersion Cancellation Using Linearly Chirped Bragg Grating Filters in Optical Waveguides," Optics Letters, vo. 12, No. 10, Oct. 1987, pp. 847–849.

Lenz et al., "General Optical All–Pass Filter Structures for Dispersion Control in WDM Systems," Journal of Lightwave Technology, vol. 17, No. 7, Jul. 1999, pp. 1248–1254.

* cited by examiner

Primary Examiner—J. F. Duverne
(74) Attorney, Agent, or Firm—Oblon, Spivak, McClelland, Maier & Neustadt, P.C.

(57) ABSTRACT

A tunable dispersion compensating device for optical communications systems has a compliant support block having a longitudinal axis and a load-receiving surface oriented substantially parallel to the longitudinal axis. The load receiving surface is suitable to receive an applied load in a direction substantially orthogonal to the longitudinal axis. A Bragg-grating fiber is disposed in the compliant support block and extends substantially along, and at an angle to, the longitudinal axis of the compliant support block.

19 Claims, 3 Drawing Sheets

TUNABLE DISPERSION COMPENSATING BANDWIDTH DEVICE FOR FIBER OPTICS SYSTEM

BACKGROUND

1. Field of Invention

The present invention relates to devices for use in optical communication systems and, more particularly, to dispersion compensating devices for optical communication systems.

2. Discussion of Related Art

Wavelength division multiplexed optical communication systems obtain an increased signal-carrying capacity of an optical fiber by transmitting signals at several closely spaced wavelength channels. The wavelength channels must be confined within a limited wavelength band due to a number of constraints such as the transmission loss, the dispersion of the fibers and the gain characteristics of optical amplifiers. Currently, substantial efforts are being devoted to increase the number of channels in each optical fiber to increase signal-carrying capacity without having to install additional optical fibers. This requires crowding the optical channels closer and closer together as more wavelength channels are added. As the channel spacing decreases, chromatic dispersion of the signals becomes an increasing problem.

There are two primary approaches currently used to deal with the dispersion problem in wavelength division multiplexed (WDM) or dense WDM communication systems. The dispersion of an optical fiber depends on both the materials used in the fiber and the "structural" features of the optical fiber. In one approach, a fiber is produced to have a negative dispersion to compensate and/or cancel the dispersion at a given point in an optical transmission line. In the second approach, a chirped Bragg-grating optical fiber is produced to cancel and/or compensate for the dispersion at a given point in an optical communication line. However, both approaches require one to know the amount of dispersion in the given point in the communication line a priori to fabricate the compensating optical fiber. Optical communication systems that are currently installed are undergoing modifications to pieces of the system without the whole system being replaced. This can result in a change to the amount of dispersion at the location of the dispersion compensating fibers. Other factors that can cause the chromatic dispersion to vary in time would be temperature changes during the day, and on a longer time scale from session to session. Prior approaches would have to remove and/or add more dispersion compensating fibers to modify the systems, but they are limited to adapting to only slow time varying systems and not to more dynamic (i.e. quick varying) time changes.

Two of the current inventors previously produced a tunable dispersion compensating device in which a Bragg-grating fiber was embedded in a compliant material parallel to a load-bearing surface. In that device, a non-linear load is applied by imposing different forces along different portions of the load bearing surface to result in a chirped Bragg-grating within the fiber. S. T. Vohra, I. N. Duling, C. C. Chang, W. I. Kaechele, M. L. Dennis, and K. P. Koo, Proceedings of European Conf. on Optical Communications, Munich, Germany, September 2000. (The entire contents of this publication are incorporated herein by reference.) However, this proposed device requires applying different forces at different points along the load-bearing surface in a coordinated way to produce the desired chirp in the Bragg-grating fiber. The current invention is directed to improvements over such a proposed device.

SUMMARY

A tunable dispersion compensating device for optical communications systems has a compliant support block that has a longitudinal axis and a load-receiving surface oriented substantially parallel to the longitudinal axis. The load receiving surface is suitable to receive an applied load in a direction substantially orthogonal to the longitudinal axis. The device also has a fiber Bragg-grating disposed in the compliant support block and extending substantially along and at an angle to the longitudinal axis of the compliant support block.

A wavelength division multiplexed optical communication system has a plurality of optical transmitters, an optical multiplexer in optical communication with the plurality of optical transmitters, a signal transmission waveguide in optical communication with the optical multiplexer, a dispersion compensating unit in optical communication with the signal transmission waveguide, an optical demultiplexer in optical communication with the signal transmission waveguide, and a plurality of receivers in communication with the demultiplexers.

The dispersion compensating unit has a compliant support block having a longitudinal axis and a load-receiving surface oriented substantially parallel to the longitudinal axis. The load-receiving surface is suitable to receive an applied load in a direction substantially orthogonal to the longitudinal axis. A fiber Bragg-grating is disposed in the compliant support block and extends substantially along, and at an angle to, the longitudinal axis of the compliant support block.

A method of making a tunable dispersion compensating device for optical communications systems includes disposing a fiber Bragg-grating into an elongated mold, pouring support material into the elongated mold, said support material being compliant when it sets, and attaching a load-supplying assembly to a top surface of the support material.

DETAILED DESCRIPTION OF EMBODIMENTS OF THE INVENTION

Figure 1A:
FIGS. 1A and 1B are schematic illustrations of a support block according to the invention under the conditions with no load applied, and with a load applied to a top, load bearing surface, respectively.
Figure 1B:

FIGS. 1A and 1B are schematic illustrations which help illustrate some features of this invention. FIG. 1A schematically illustrates a support block 10 of compliant material under the condition in which there is no load on the top surface 12. FIG. 1B illustrates the same support block 10 of compliant material in which an element 14 is placed on the top surface 12 (see FIG. 1A) in order to provide a vertical downward-directed load on the support block 10. The compliant material of the support block 10 is generally selected from materials that are compressible and stretchable and restore to substantially their initial shape once the vertical load is removed, i.e., little hysteresis. A suitable compliant material for the support block 10 is a polymer.

One can see from FIG. 1B that the application of a vertical load on the support block 10 results in the support block 10 being squeezed between the load producing element 14 and a restraining surface below the support block 10 (not shown). The compliant material of the support block 10 squeezes out opposing ends, resulting in a strain within the support block that varies along the vertical direction. Generally, the strain will decrease exponentially in the vertical direction according to the Poisson effect. Although the Poisson effect is useful to understand strain induced in the support block 10, the invention is not limited to the correctness of this theoretical understanding.

Figure 2:
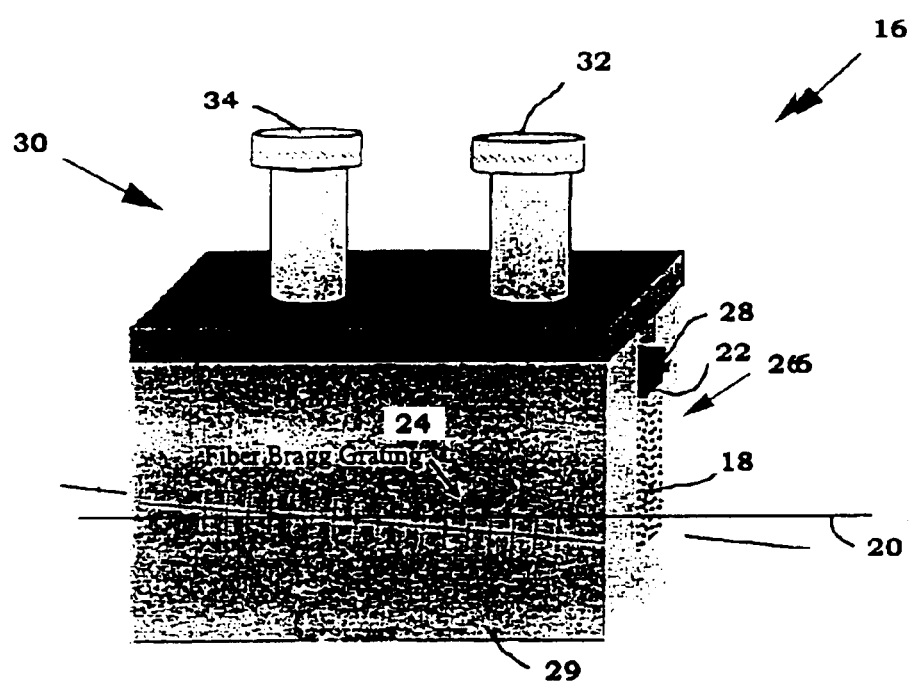
FIG. 2 illustrates a tunable dispersion compensating device according to an embodiment of this invention.

FIG. 2 illustrates an embodiment of a tunable dispersion compensating device 16 according to this invention. The tunable dispersion compensating device 16 has a compliant support block 18. The material of the compliant support block 18 is selected from suitable compliant materials, as noted above. The compliant support block 18 has a longitudinal axis 20 which is substantially parallel to a load-receiving surface 22 that is suitable to receive a load, i.e., an applied force, in a direction substantially orthogonal to the longitudinal axis 20.

The tunable dispersion compensating device 16 also has a fiber Bragg-grating 24 embedded within the compliant material of the support block 18. The fiber Bragg-grating fiber 24 is an optical fiber that has a Bragg-grating structure written therein. The Bragg-grating structure is a variation of refractive index of the optical fiber along the length of the fiber. The tunable dispersion compensating device 16 can also have a plurality of microspheres 26 disposed within the compliant material of the support block 18. A substantially rigid bar 28 is disposed on the compliant support block between the Bragg-grating fiber and the load receiving surface of the compliant support block 18. An example of a suitable material for the microspheres 26 is glass and a suitable material for the substantially rigid bar 28 is aluminum. One may also provide a support frame 29 extending around the peripheral edges of the support block 18. The support frame 29 is open, or a space is reserved along the longitudinal ends of a support block, to permit the compliant material of the support block 18 to expand along the longitudinal direction in response to an applied load.

The tunable dispersion compensating device 16 also has a micrometer assembly attached to the support frame 29. In this embodiment, the micrometer assembly 30 has micrometer screws 32 and 34. Although there are two micrometer screws 32 and 34 in this embodiment, the invention is not limited to only an assembly with two micrometer screws. One should readily appreciate that other constructions could include one micrometer screw or more than two micrometer screws without departing from the scope and spirit of this aspect of the invention. The dimensions of the tunable dispersion compensating device 16 may be selected according to the desired application. The inventors found a suitable size for an exemplary application to be 4" long along the longitudinal direction, ½" deep and 2" high. The edges and bottom corners of the support block 18 and support frame 29 are flat in the example illustrated in FIG. 2, but this is not a necessary feature of the invention. For example, a U-shaped support frame has been found to be suitable.

A method of manufacturing a tunable dispersion compensating device according to this invention includes placing a Bragg grating into an aluminum mold. A U-shaped mold is suitable. Exemplary dimensions found to be suitable are ½"×2"×4". A Bragg-grating 8 mm long was found to be suitable for particular applications. However, one may vary the dimensions and the shape of the mold without departing from the scope and spirit of this invention. Although aluminum has been found to be a suitable material, the material of the mold may be selected from a wide range of materials. The U-shaped aluminum mold may remain as a support frame. In this case, the opposing longitudinal ends of the mold are open to permit the compliant material of the support block 18 to expand and contract along the longitudinal direction. The angle of the Bragg-grating fiber with respect to the longitudinal axis 20 may be selected according to the desired application. To ensure good adhesion of the fiber, one may precoat the fiber with the same compliant material as the support block 18, for example a polymer material. The Bragg-grating fiber 24 may be placed with one end on or close to the bottom of the support frame while the opposing longitudinal end of the Bragg-grating fiber 24 is distal from the bottom of the support frame (typically halfway up in the vertical direction). The compliant material of the support block 18 is then poured into the mold. The compliant material may have a plurality of microspheres mixed therein. A suitable material of the support block is selected from a polymer and glass microspheres are suitable for the plurality of microspheres 26. The compliant material of the support block 18 should have the final dimensions of the mold in a longitudinal direction, but approximately ½ the height. Once the compliant material is completely set, a substantially rigid bar 28 is placed on the load-bearing surface 22 of the support block 18. Then, the micrometer assembly is attached to the support frame 29.

Figure 3:
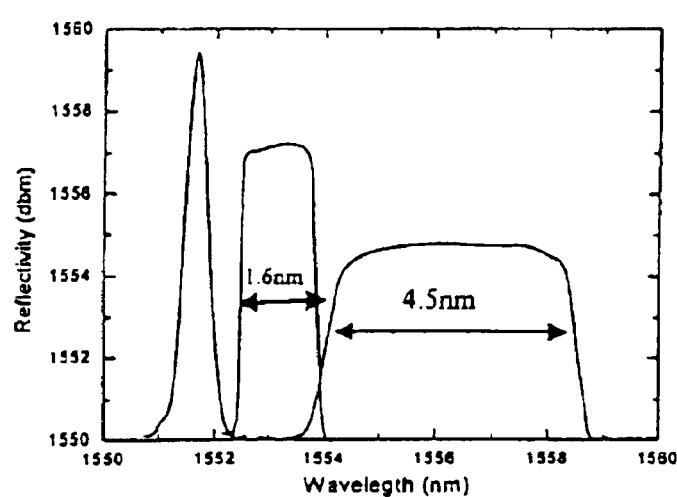
FIG. 3 illustrates reflectivity versus wavelength for three different loads applied to the support block of FIG. 2.

In operation, one increases the load on the support block 18 by turning one, or both, micrometer screws 32 and 34 such that they drive downward onto the substantially rigid bar 28, which in turn imposes a downward load on the support block 18. A strain along the longitudinal direction of the support block 18 causes portions of the Bragg-grating fiber 22 to stretch by an amount which depends on their respective location in the vertical direction of the support block 18. This non-linear stretching of the Bragg-grating fiber 24 produces a chirped Bragg-grating. The fact that the Bragg-grating fiber 24 is at a non-zero angle with respect to the longitudinal axis 20 permits one to apply a linear-downward directed load on the support block 18 to produce a non-linear strain in the Bragg-grating fiber 24. Once the angle of the Bragg-grating fiber 24 is selected and fixed within the support block 18, varying the strength of the downward directed load on the support block 18 results in a varying chirp of the Bragg-grating. Varying the chirp results in varying the bandwidth and central maximum of the reflectivity of the Bragg-grating 24. Reflectively spectra for a Bragg-grating fiber under three different load conditions is illustrated in FIG. 3. Tuning the reflectively spectrum of the Bragg-grating fiber in this way permits one to cancel and/or compensate for dispersion at a given point in the fiber by varying the downward force on the support block 18. The plurality of microspheres 26 mixed into the compliant material of the support block 18 help to enhance the Poisson effect. This is true irrespective of whether the Bragg-grating fiber is aligned with, or at an angle to the longitudinal axis 20.

Figure 4:
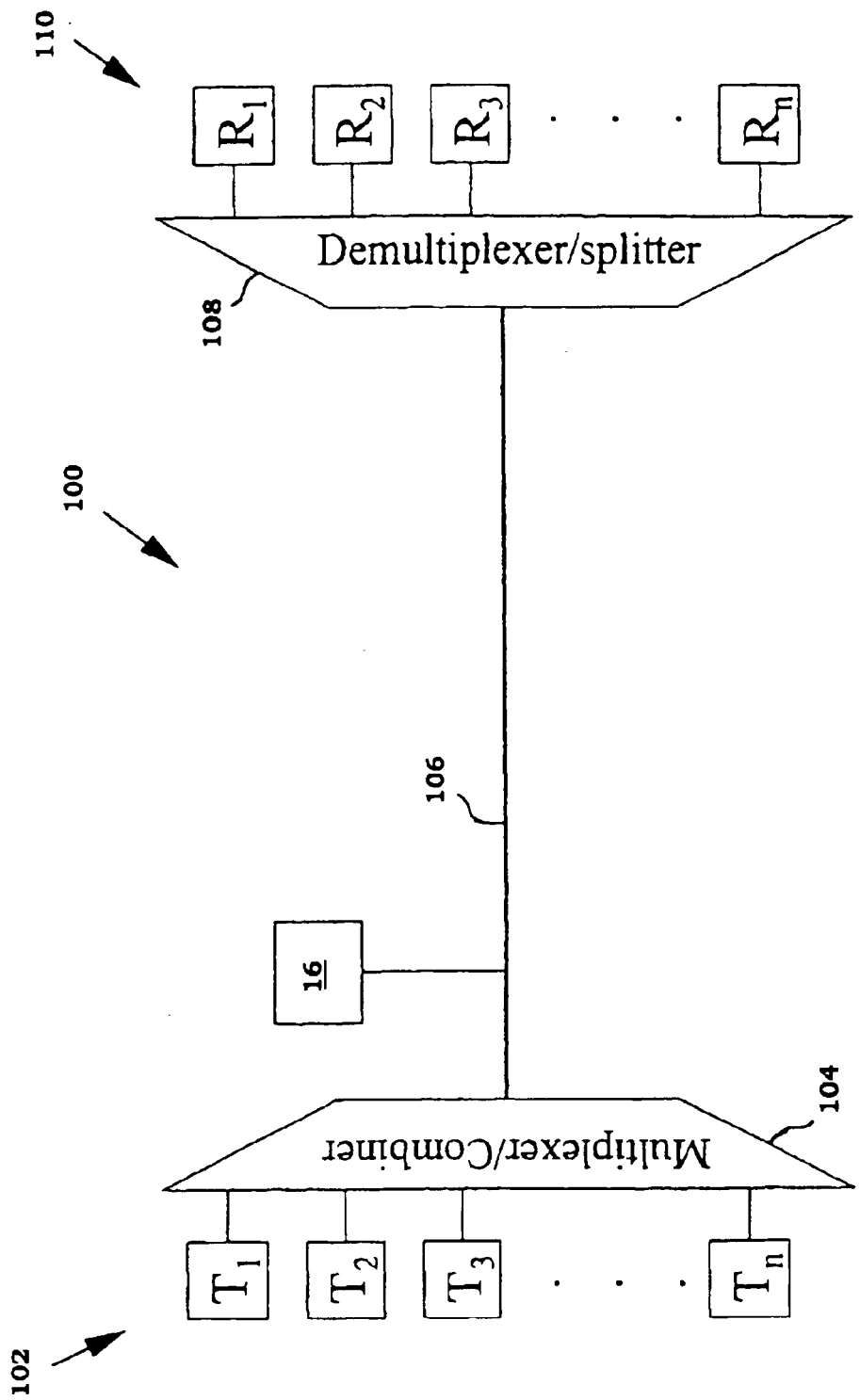
FIG. 4 illustrates a wavelength division multiplexed optical communication system that includes a tunable dispersion compensating device according to this invention.

The tunable dispersion compensating device 16 may be installed at various points within an optical communication system to cancel or compensate for chromatic dispersion. FIG. 4 illustrates a wavelength division multiplexed optical communication system 100 that has a plurality of optical transmitters 102, an optical multiplexer 104 in communication with the plurality of optical transmitters 102, a signal transmission waveguide 106 in optical communication with the optical multiplexer 104, an optical demultiplexer 108 in optical communication with the signal transmission waveguide 106 and a plurality of receivers 110 in optical communication with the optical demultiplexer. The tunable dispersion compensating device 16 may be inserted at various points within the optical communication system 100, such as along the path of the signal transmission waveguide 106, at either end of the signal transmission waveguide 106, between any one of the optical transmitters 102 and optical multiplexer 104, or between any one of the optical receivers 110 and the optical demultiplexer 108. FIG. 4 illustrates the example in which the tunable dispersion compensating device 16 is inserted along the path of the signal transmission waveguide 106. One may also include more than one tunable dispersion compensating device within an optical communication system, as needed.

In the illustrated embodiment, the downward imposed force (the applied load) is mainly applied by turning screws of the micrometer assembly 30. The invention is not limited to only applying the load with a micrometer assembly. One with ordinary skill in the art should recognize from the teachings herein that there are many alternative ways in which one could apply a downward force on the support block 18 to induce, or vary, the chirp of the fiber Bragg-grating 24. One may have an automated assembly which may also include responses to feedback information. One may determine the amount of dispersion in a signal to determine the amount of the load to apply to a given tunable dispersion compensating device. One with ordinary skill in the art should recognize that these and other modifications to the above illustrated embodiments are possible without departing from the scope of this invention. All such modifications are intended to be included within the scope of this invention, as defined in the following claims.

We claim:

1. A tunable dispersion compensating device for optical communications systems, comprising:
    a compliant support block having a longitudinal axis and a load-receiving surface oriented substantially parallel to said longitudinal axis, said load receiving surface being suitable to receive an applied load in a direction substantially orthogonal to said longitudinal axis; and
    a Bragg-grating fiber disposed in said compliant support block and extending substantially along and at an angle to said longitudinal axis of said compliant support block.

2. A tunable dispersion compensating device according to claim 1, further comprising a support frame, said compliant support block being disposed in said support frame,
    wherein said support frame is open on opposing longitudinal ends suitable to allow said compliant support block to expand along said longitudinal axis in response to said applied load in said direction substantially orthogonal to said longitudinal axis.

3. A tunable dispersion compensating device according to claim 1, further comprising a substantially rigid bar disposed in said compliant support block between said Bragg-grating fiber and said load-receiving surface of said compliant support block.

4. A tunable dispersion compensating device according to claim 3, wherein said substantially rigid bar is an aluminum bar.

5. A tunable dispersion compensating device for optical communications systems, comprising:
    a compliant support block having a longitudinal axis and a load-receiving surface oriented substantially parallel to said longitudinal axis, said load receiving surface being suitable to receive an applied load in a direction substantially orthogonal to said longitudinal axis;
    a Bragg-grating fiber disposed in said compliant support block and extending substantially along and at an angle to said longitudinal axis of said compliant support block;
    a substantially rigid bar disposed in said compliant support block between said Bragg-grating fiber and said load-receiving surface of said compliant support block; and
    a plurality of microspheres disposed in said compliant support block between said substantially rigid bar and said Bragg-grating fiber.

6. A tunable dispersion compensating device according to claim 5, wherein said microspheres are glass microspheres.

7. A tunable dispersion compensating device according to claim 5, further comprising a support frame, said compliant support block being disposed in said support frame,
    wherein said support frame is open on opposing longitudinal ends suitable to allow said compliant support block to expand along said longitudinal axis in response to said applied load in said direction substantially orthogonal to said longitudinal axis.

8. A tunable dispersion compensating device according to claim 7, further comprising a micrometer assembly attached to said support frame proximate said substantially rigid bar,
    wherein said micrometer assembly comprises a micrometer screw member adapted to apply a load to said Bragg-grating fiber, transferred through said substantially rigid bar.

9. A tunable dispersion compensating device according to claim 8, wherein said micrometer assembly further comprises a second micrometer screw member adapted to apply a load to said Bragg-grating fiber, transferred through said substantially rigid bar.

10. A wavelength division multiplexed optical communication system, comprising:
    a plurality of optical transmitters;
    an optical multiplexer in optical communication with said plurality of optical transmitters;
    a signal transmission waveguide in optical communication with said optical multiplexer;
    a dispersion compensating unit in optical communication with said signal transmission waveguide;
    an optical demultiplexer in optical communication with said signal transmission waveguide; and
    a plurality of optical receivers in communication with said optical demultiplexer,
    wherein said dispersion compensating unit comprises:
    a compliant support block having a longitudinal axis and a load-receiving surface oriented substantially parallel to said longitudinal axis, said load-receiving surface being suitable to receive an applied load in a direction substantially orthogonal to said longitudinal axis, and
    a Bragg-grating fiber disposed in said compliant support block and extending substantially along, and at an angle to said longitudinal axis of said compliant support block.

11. A method of making a tunable dispersion compensating device for optical communications systems, comprising:
    disposing a Bragg-grating fiber into an elongated mold;

pouring support material into said elongated mold, said support material being compliant when it sets; and attaching a load-supplying assembly to said support material.

12. A method of making a tunable dispersion compensating device for optical communications systems according to claim 11, further comprising mixing microspheres into said support material prior to said pouring said support material into said elongated mold.

13. A method of making a tunable dispersion compensating device for optical communications systems according to claim 12, wherein said microspheres are glass microspheres.

14. A method of making a tunable dispersion compensating device for optical communications systems, comprising:

disposing a Bragg-grating fiber into an elongated mold;

pouring support material into said elongated mold, said support material being compliant when it sets;

attaching a load-supplying assembly to said support material;

mixing microspheres into said support material prior to said pouring said support material into said elongated mold; and precoating said Bragg-grating fiber with said support material prior to said pouring said support material into said elongated mold.

15. A method of making a tunable dispersion compensating device for optical communications systems according to claim 11, wherein said support material is a polymer material.

16. A method of making a tunable dispersion compensating device for optical communications systems according to claim 11, wherein said load-supplying assembly comprises a micrometer assembly and a substantially rigid bar.

17. A method of making a tunable dispersion compensating device for optical communications systems, comprising:

disposing a Bragg-grating fiber into an elongated mold;

pouring support material into said elongated mold, said support material being compliant when it sets; and attaching a load-supplying assembly to said support material, wherein said Bragg-grating fiber is disposed with one end proximate bottom surface region of said elongated mold and a longitudinally opposing end distal from a corresponding bottom surface region of said elongated mold so that said Bragg-grating fiber is inclined with respect to said top surface of said compliant material.

18. A tunable dispersion compensating device for optical communications systems, comprising:

a compliant support block defining a load receiving surface, said compliant support block comprising a plurality of microspheres and a compliant material; and a Bragg-grating fiber disposed in said compliant support block.

19. A tunable dispersion compensating device according to claim 18, wherein said microspheres are glass microspheres and said compliant material is selected from a polymer material.

* * * * *